May 26, 1970  J. E. NEMECEK  3,514,125
SAFETY APPARATUS AND METHOD OF ASSEMBLY THEREOF
Filed June 20, 1968  2 Sheets-Sheet 1

INVENTOR.
JERRY E. NEMECEK
BY
Yount, Flynn & Tarolli
ATTORNEYS

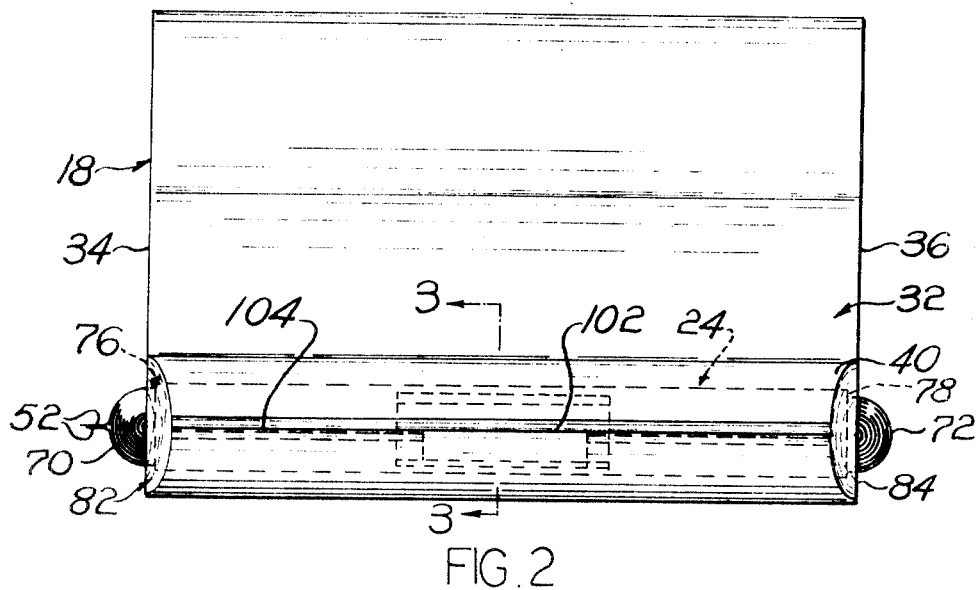
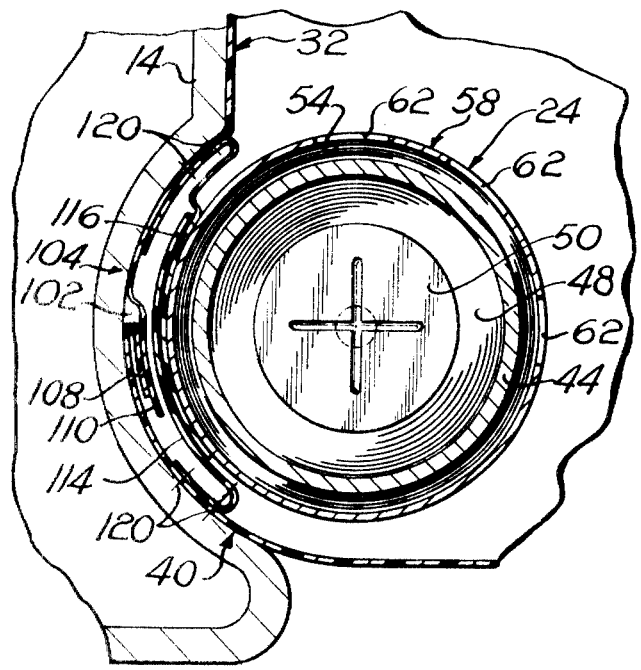
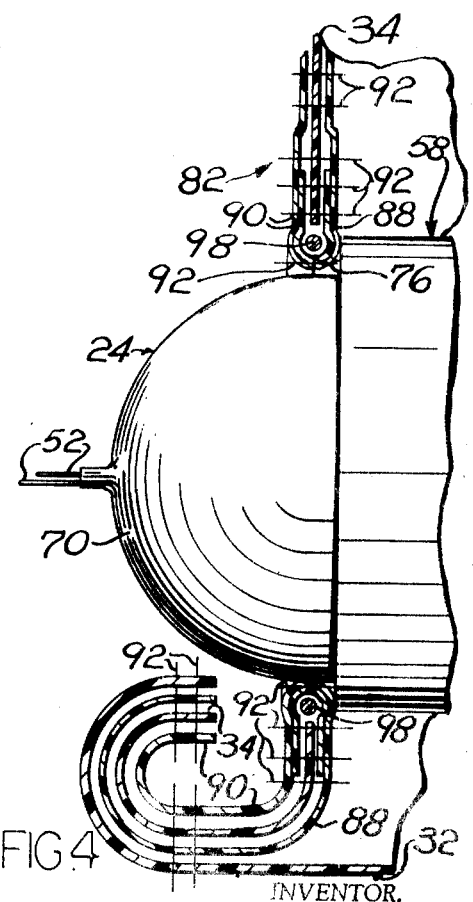

United States Patent Office 3,514,125
Patented May 26, 1970

3,514,125
SAFETY APPARATUS AND METHOD OF ASSEMBLY THEREOF
Jerry E. Nemecek, Ferndale, Mich., assignor to Eaton Yale & Towne Inc., Cleveland, Ohio, a corporation of Ohio
Filed June 20, 1968, Ser. No. 738,462
Int. Cl. B60r 25/00
U.S. Cl. 280—150                                      11 Claims

ABSTRACT OF THE DISCLOSURE

A vehicle safety apparatus includes an inflatable confinement and an inflation assembly for inflating the confinement. The confinement has a slit through which the inflation assembly is inserted into the interior of the confinement. The inflation assembly is then manipulated within the confinement so that opposite ends of the inflation assembly engage seal assemblies formed in opposite sidewalls of the confinement.

---

The present invention relates to vehicle safety apparatus which includes a confinement and an assembly for inflating the confinement upon the vehicle encountering a collision. The inflated confinement restrains an occupant of the vehicle so that the occupant does not forcefully impact a structural part of the vehicle.

The principal object of the present invention is to provide a new and improved vehicle safety apparatus which is relatively inexpensive and easily assembled and includes a confinement which is adapted to restrain movement of an occupant of the vehicle during a collision and an inflation assembly which is located within the confinement and operates to inflate the confinement upon the occurrence of a collision.

Another object of this invention is to provide a new and improved vehicle safety apparatus, in accordance with the preceding paragraph, wherein the confinement includes an opening for providing access to the interior of the confinement and through which the inflation assembly is inserted into the confinement, the opening being closed after insertion of the inflation assembly therethrough.

A further object of the present invention is the provision of a new and improved safety apparatus including a confinement adapted to be mounted on a part of a vehicle and an inflating means for providing a flow of fluid to expand the confinement located within the confinement with opposite end portions thereof projecting out of the confinement, and wherein the confinement has a slit through which the inflating means is inserted into the confinement and a flap seal is provided to block leakage of fluid through the slit when the confinement is in the expanded condition and seal assemblies are provided for engaging the opposite ends of the inflating means for providing a flow of fluid to prevent a leakage of fluid therearound when the confinement is in the expanded condition.

Another object of the present invention is to provide a new and improved method of assembling a safety apparatus including a confinement adapted to be inflated from a collapsed condition to an expanded condition to restrain an occupant of a vehicle against movement during a collision and an inflation assembly for inflating the confinement to the expanded condition upon the occurrence of a collision, wherein the method includes the steps of inserting the inflation assembly into the confinement, engaging one end of the inflation assembly with a first seal assembly located on one portion of the confinement, and positioning another end of the inflation assembly in engagement with a second seal assembly located on another portion of the confinement to thereby sealingly engage the inflation assembly with the seal assemblies and to position the inflation assembly in a predetermined relationship with the confinement.

These and other objects and features of the invention will become more apparent upon a consideration of the following description taken in connection with the accompanying drawing wherein:

FIG. 2 is an elevational view, taken along the line 2—2 of FIG. 1, of the safety apparatus;

Figure 1:
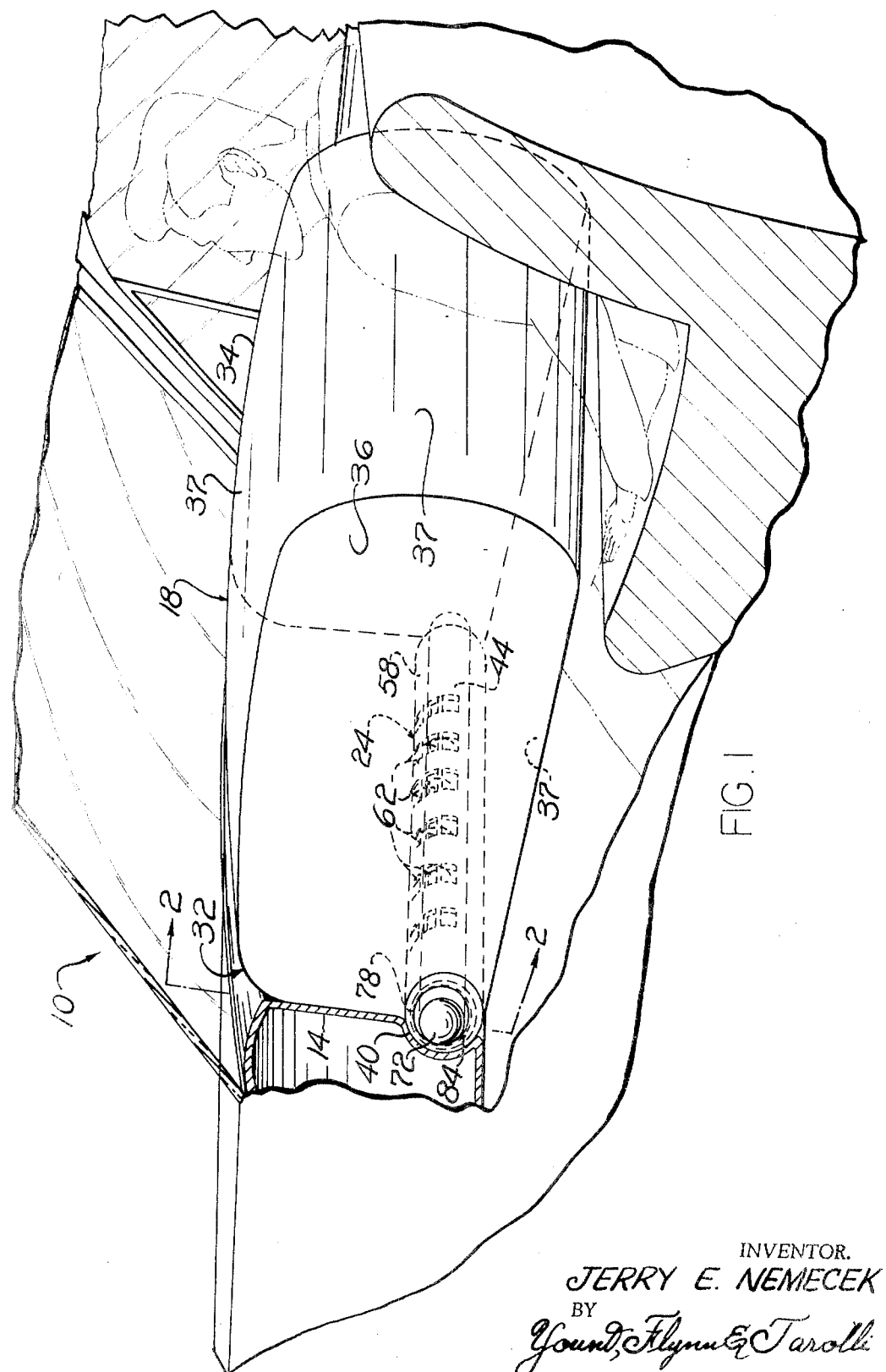
FIG. 1 is a schematic illustration showing a safety apparatus forming a preferred embodiment of the invention, the safety apparatus being adapted to be mounted in a vehicle and including a confinement shown in an expanded condition for restraining movement of an occupant of the vehicle during a collision.

FIG. 3 is an enlarged fragmentary sectional view, taken along the line 3—3 of FIG. 2, illustrating the structure of an inflation means for expanding the confinement and an opening or slit through which the inflation assembly is inserted into the interior of the confinement, the inflation assembly and opening in the confinement being shown for purposes of clarity of illustration in a partially separated relationship; and FIG. 4 is an enlarged fragmentary sectional view illustrating the engagement of one end portion in the inflation assembly with a seal assembly provided in an end wall of the confinement.

The present invention provides an improved vehicle safety apparatus and method of assembling the vehicle safety apparatus. The vehicle safety apparatus of the present invention includes an inflatable confinement having an inoperative collapsed condition and an operative expanded condition. An inflation assembly is inserted into the confinement through an opening in the confinement and is sealingly engaged by seal assemblies provided in opposite end walls of the confinement. Upon the occurrence of a collision, the inflation assembly is actuated to inflate the confinement to restrain an occupant of the vehicle against movement resulting from the collision. The vehicle safety apparatus embodying the present invention may be utilized in vehicles of many different types, such as automobiles, airplanes, and trucks.

As representing a preferred embodiment of the invention, a vehicle safety apparatus 10 is illustrated in FIGS. 1 and 2 and may be associated with different parts of the automotive vehicle, such as the dashboard, or the back of the front seat. As illustrated in FIGS. 1 and 3, the vehicle safety apparatus 10 is located in association with the dashboard 14 of the vehicle. The vehicle safety apparatus 10 includes a confinement 18 which has a collapsed or contracted condition (not shown) and an expanded condition which is shown in FIG. 1.

When the confinement 18 is in the contracted condition, the confinement is compacted closely adjacent to an inflation assembly 24 which extends transversely of the confinement and is secured to the dashboard 14. Upon occurrence of the collision, the inflation assembly 24 is operated to release fluid under pressure to inflate the confinement 18 from the contracted condition to the expanded condition. The expanded or inflated confinement 18 extends transversely of the vehicle between the steering wheel of the vehicle and the door on the passenger side of the vehicle so as to have an extent when inflated which is approximately equal to the extent of the front seat of the vehicle between the steering wheel and the door of the vehicle. In view of its size, the confinement 18 is operable to restrain the movement of a plurality of occupants located in the front seat of the vehicle.

The confinement 18 includes a first or forward side portion 32 which is adapted to engage the dashboard 14 of the vehicle. A pair of end walls 34 and 36 are connected to the forward side portion 32. The generally polygonal configuration of the confinement 18 is completed by a plurality of interconnected side portions 37. The confinement 18 can have many configurations including that disclosed in copending application Ser. No. 735,699, filed on June 10, 1968, and assigned to the assignee of the present invention. The inflation assembly 24 is positioned in an outwardly protruding envelope or bulge 40 in the forward portion 32 of the confinement 18.

The inflation assembly 24 (see FIG. 3) includes a supply of fluid which preferably is a reservoir 44 which defines a fluid chamber 48 filled with fluid under pressure. An explosive means 50 is ignited in a known manner by means of current flowing through wires 52 (see FIG. 3) upon the occurrence of a collision to effect opening of the reservoir 44. When the reservoir 44 is opened, fluid under pressure flows outwardly into a space 54 between a diffuser 58 and the reservoir 44. Fluid from the chamber 48 flows axially, in the space 54, along the diffuser 58 and the reservoir 44. The diffuser 58 is provided with a plurality of slots or passages 62 which communicate with the space 54 and direct the outward flow of fluid to expand the confinement 18.

The confinement 18 and inflation assembly 24 are interconnected in a predetermined relationship by mounting the inflation assembly in the arcuate outwardly projecting envelope or bulge 40 (FIG. 2) formed in the forward side portion 32. Opposite ends 70 and 72 of the inflation assembly 24 project through the end walls 34 and 36 and have shoulders 76 and 78 which are engaged by annular seal assemblies 82 and 84 which prevent leakage of fluid from the confinement 18 when it is expanded. To this end, this seal assembly 82 includes inner and outer reinforcing disks 88 and 90 which are stitched (at points indicated schematically at 92 in FIG. 4) to each other, the end wall 34 and the forward side portion 32. The reinforcing disks 88 and 90 enclose a metallic reinforcing ring 98 having a central opening which is smaller than the diameter of the shoulder 76 of the inflation assembly 24. The seal assembly 84 is generally similar in structure to the seal assembly 82, therefore, it is believed that the structure of the seal assembly 84 will be apparent to those skilled in the art without further description.

The seal assemblies 82 and 84 (see FIGS. 2 and 4) are pressed into tight sealing engagement with the shoulders 76, 78 on the ends 70, 72 of the inflation assembly 24 by the forward side portion 32 of the confinement 18. This sealing engagement between the seal assemblies 82, 84 and the end portions of the inflation assembly 24 results from the fact that the forward side portion 32 is formed of a resilient material, such as a fabric having a polymeric coating, and has a transverse dimension which is less than the length of the inflation assembly 24. Therefore, the forward side portion pulls the seal assemblies 82, 84 into contact with the shoulders 76, 78 of the inflation assembly 24 to provide fluid-tight joints between the inflation assembly and the seal assemblies.

The inflation assembly 24 is mounted within the confinement 18 by first inserting one of the ends 70 or 72 of the inflation assembly through an open portion or slit 102 (see FIGS. 2 and 3) in a seam 104 in the side portion 32. Once it is fully within the confinement, the inflation assembly 24 is rotated about a transverse axis and the end 70 inserted through the opening in the seal assembly 82 so that the seal assembly 82 sealingly engages the shoulder 76 on the inflation assembly. The forward side portion 32 is then stretched or resiliently deformed to enable the opposite end 72 of the inflation assembly to be inserted through the central opening of the seal assembly 84. The natural resilience of the forward side portion 32 then pulls the two seal assemblies 82 and 84 into secure abutting engagement with the shoulders 76 and 78 on the inflation assembly to thereby prevent the leakage of fluid through the central openings in the seal assemblies.

After the inflation assembly 24 has been mounted within the confinement 18, the open portion 102 of the seam 104 is blocked or sealed by clamping the open portion 102 between the outer surface of the diffuser 58 and the dashboard 14 (the inflation assembly 24 being shown in FIG. 3 at a location to the right of its normal position to clearly illustrate the structure of the open portion or slit 102). The clamping action between the dashboard 14 and the diffuser 58 presses inwardly projecting overlapping end portions 108 and 110 of the material forming the side portions of the confinement 18 into sealing abutting engagement to prevent the escape of fluid through the open portion 102 of the seam 104. Although a separate slit could, if desired, be provided in the side portion 32 to provide access to the interior of the confinement 18, the provision of the open portion 102 of the seam 104 simplifies the construction of the confinement 18.

While the abutting engagement between the end portions 108 and 110 may be adequate to seal the open portion 102 of the seam 56, a pair of closure flaps 114 and 116 are mounted within the confinement 18 adjacent to the open portion 102 of the seam 104 to further seal the open portion of the seam. The closure flaps 114 and 116 are mounted on the side portion 32 by stitching indicated schematically at 120 in FIG. 3. The closure flaps 114 and 116 are pressed against the end portions 108 and 110 and against the forward side portion 32 by a clamping action between the dashboard 14 and the inflation assembly 24. This clamping action provides a secure seal between the closure flaps 114 and 116 and between the material forming the end portions 108 and 110 of the side portion 32 to prevent an escape of fluid from the confinement 18 when the confinement is in the expanded condition.

In view of the foregoing description, it can be seen that the assembly of the confinement 18 and inflation assembly 24 is simplified by the provision of a slit or open portion 102 in the seam 104 and seal assemblies 82 and 84 in the end walls 34 and 36 of the confinement. During assembly of the safety apparatus 10, the inflation assembly 24 is first inserted lengthwise through the open portion 102 of the seam 104. The inflation assembly 24 is then rotated and one end is moved into engagement with one of the seal assemblies and the forward side portion 32 of the confinement 18 is resiliently stretched to enable the opposite seal assembly to be brought into engagement with the opposite end of the inflation assembly 24. The natural resilience of the forward side portion 32 then pulls the seal assemblies into sealing abutting engagement with the opposite shoulders 76 and 78 formed on the diffuser 58. The inflation assembly 24 is subsequently secured to the dashboard of a vehicle, with the confinement 18 in a collapsed or contracted condition, by a suitable fastening means. The open portion 102 of the seam 104 is then sealed by clamping action between the inflation assembly and dashboard. In the illustrated embodiment of the invention, closure flaps 114 and 116 are provided to ensure that the open portion 102 of the seam is sealed when the safety apparatus is mounted in a vehicle.

Having described my invention, I claim:

1. A method of assembling a safety apparatus having a confinement adapted to be inflated from a collapsed condition to an expanded condition to restrain an occupant of a vehicle against movement during a collision and an inflation assembly for inflating the confinement to the expanded condition upon the occurrence of a collision, said method comprising the steps of providing an opening in said confinement, inserting the inflation assembly into the confinement through said opening, engaging one end of the inflation assembly with a first seal assembly located on one portion of the confinement, and positioning another end of the inflation assembly in engagement with a second seal assembly located on another portion of the confinement to thereby sealingly engage the inflation assembly with the seal assemblies and to position the inflation assembly in a predetermined relationship with the confinement.

2. A method of assembling a safety apparatus as set forth in claim 1 further including the step of closing said opening after insertion of said inflation assembly therethrough.

3. A method of assembling a safety apparatus as set forth in claim 1 wherein said step of inserting the inflation assembly into said confinement includes moving the inflation assembly lengthwise through said opening in the confinement.

4. A method of assembling a safety apparatus as set forth in claim 3 wherein said method further includes the step of closing the opening in the confinement by pressing the portion of the confinement in which the opening is formed against a part of a vehicle with the inflation assembly.

5. A method of assembling a safety apparatus as set forth in claim 3 wherein said method further includes the step of rotating the inflation assembly within the confinement about a transverse axis of the inflation assembly after moving the inflation assembly through the opening in the confinement.

6. A method of assembling a vehicle safety apparatus including a confinement adapted to be inflated from a collapsed condition to an expanded condition to restrain movement of an occupant of a vehicle during a collision and an inflation assembly for inflating the confinement from the collapsed condition to the expanded condition, said method comprising the steps of inserting the inflation assembly into the confinement through a slit formed in one portion of the confinement, sealingly engaging one end portion of the inflation assembly with a first seal assembly formed on the confinement with the one end portion of the inflation assembly projecting out of the confinement through the first seal assembly to provide access to the one end portion of the inflation assembly, sealingly engaging another end portion of the inflation assembly opposite from the one end portion with a second seal assembly formed on the confinement with the other end portion of the inflation assembly projecting out of the confinement through the second seal assembly to provide access to the other end portion of the inflation assembly, and blocking the slit in the confinement by pressing a portion of the confinement in which the slit is formed against the vehicle with the inflation assembly to thereby prevent an escape of fluid from the confinement through the slit when the confinement is in an expanded condition.

7. A method of assembling a vehicle safety apparatus as set forth in claim 6 wherein said confinement includes flap means located adjacent to the slit and said step of blocking the slit includes pressing the flap means against the portion of the confinement in which the slit is formed and to a location overlying the slit to further prevent a leakage of fluid through said slit when the confinement is in the expanded condition.

8. A method of assembling a vehicle safety apparatus as set forth in claim 6 wherein the first and second seal assemblies are urged into abutting sealing engagement with the end portions of the inflation assembly by the natural resilience of the material forming the confinement.

9. A vehicle safety apparatus comprising a confinement having a collapsed condition and an expanded condition, said confinement in said expanded condition engaging an occupant of the vehicle to restrain movement of the occupant as a result of a collision, an inflation assembly for providing a flow of fluid for effecting expansion of said confinement, said inflation assembly being located partially within said confinement with opposite ends projecting out of said confinement, said confinement having portions defining an opening for providing access to the interior of said confinement to facilitate placement of said inflation assembly in said confinement, means closing said opening, and seal means for sealingly engaging said opposite end portions of said inflation assembly to prevent an escape of fluid from said confinement around said opposite end portions of said inflation assembly when said confinement is in said expanded condition.

10. A vehicle safety apparatus as set forth in claim 9 wherein said means closing said opening comprises flaps secured to said confinement adjacent to said opening.

11. A vehicle safety apparatus as set forth in claim 9 wherein said seal means is urged into sealing engagement with said inflation assembly by said confinement.

References Cited

UNITED STATES PATENTS

| | | | |
|---|---|---|---|
| 2,095,974 | 10/1937 | Finch | 9—11 |
| 2,755,125 | 7/1956 | Hodges | 280—150 X |
| 2,850,291 | 9/1958 | Ziccardi | 280—150 |
| 3,414,292 | 12/1968 | Oldberg et al. | 280—150 |

KENNETH H. BETTS, Primary Examiner